June 12, 1962 W. R. SIMMONS 3,038,626
MECHANISM FOR SETTING RIVETS
Filed July 19, 1960 4 Sheets-Sheet 1
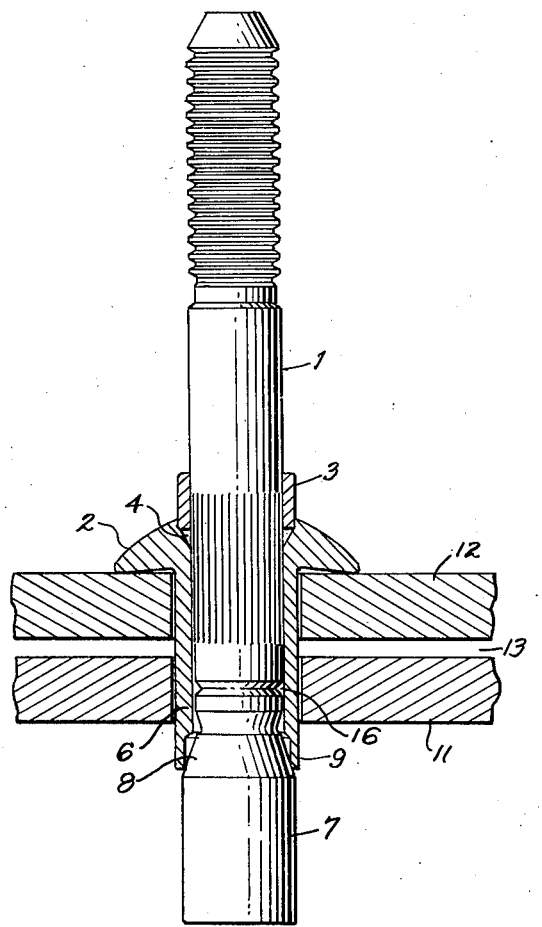
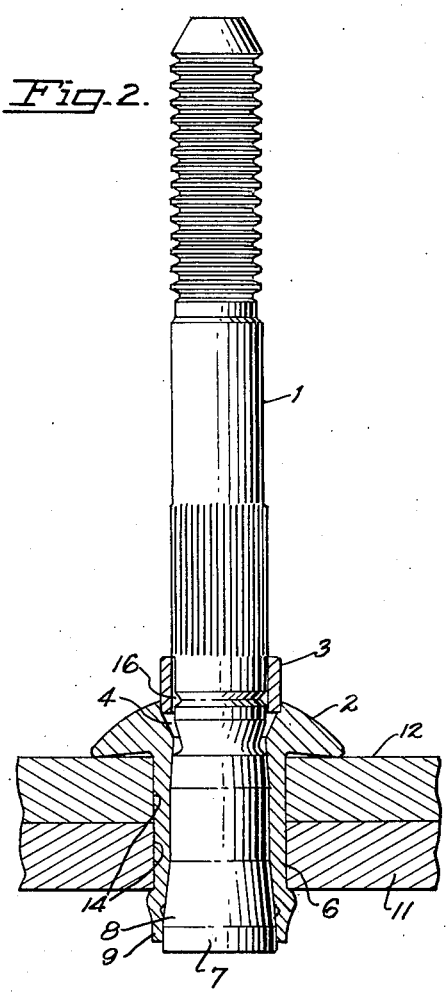
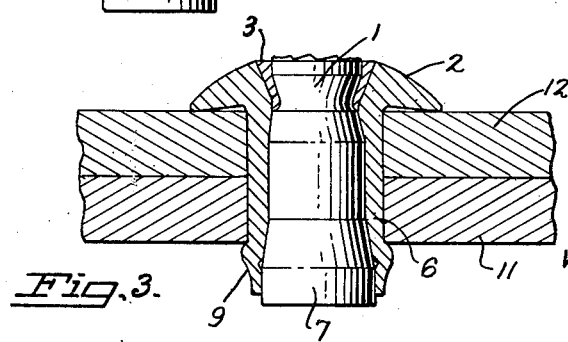
INVENTOR.
WALTER RUSSELL SIMMONS
BY George B. White
ATTORNEY.

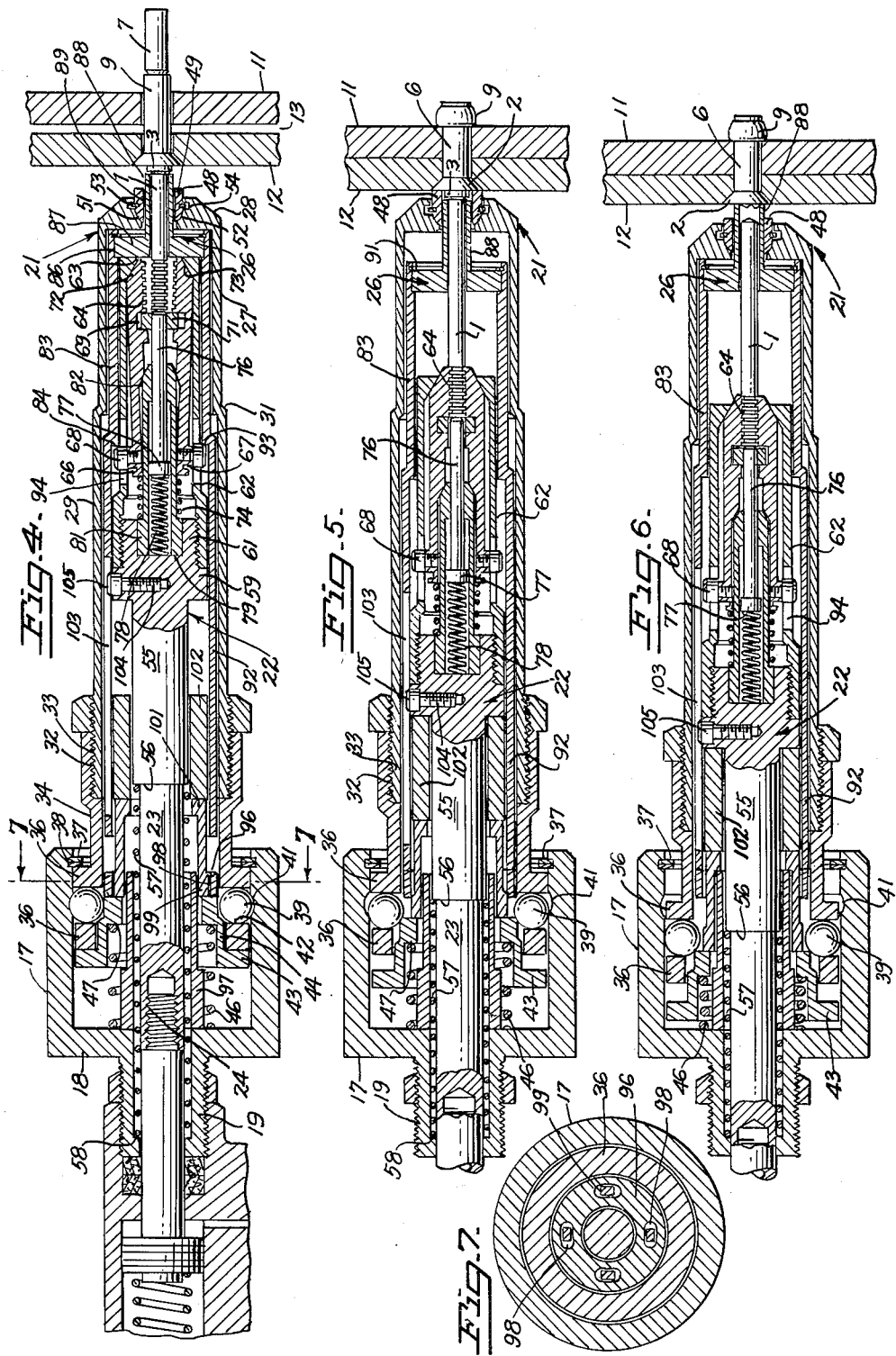

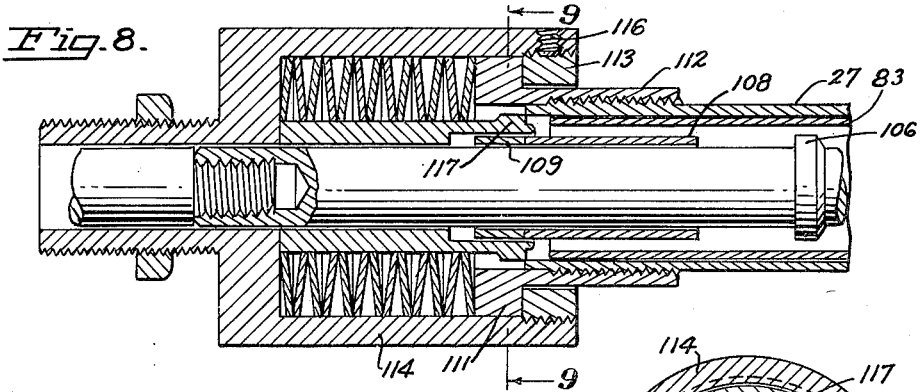
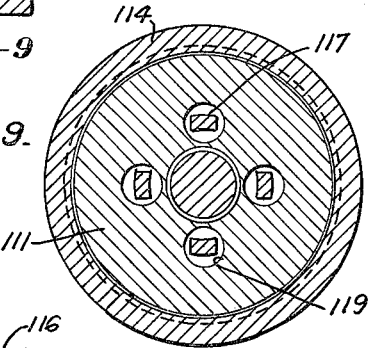
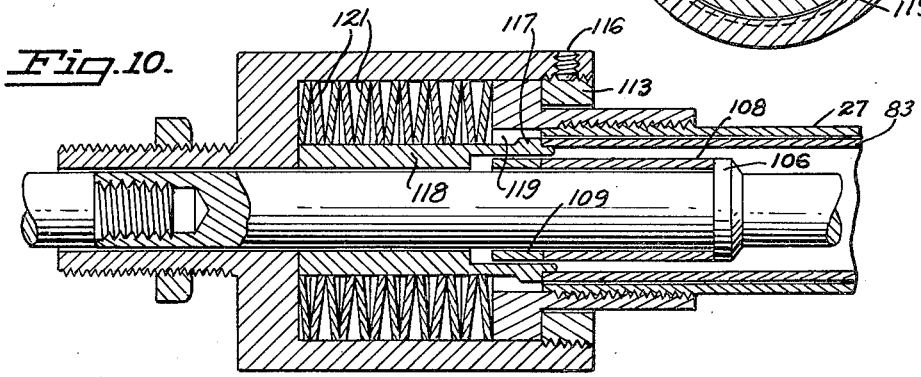
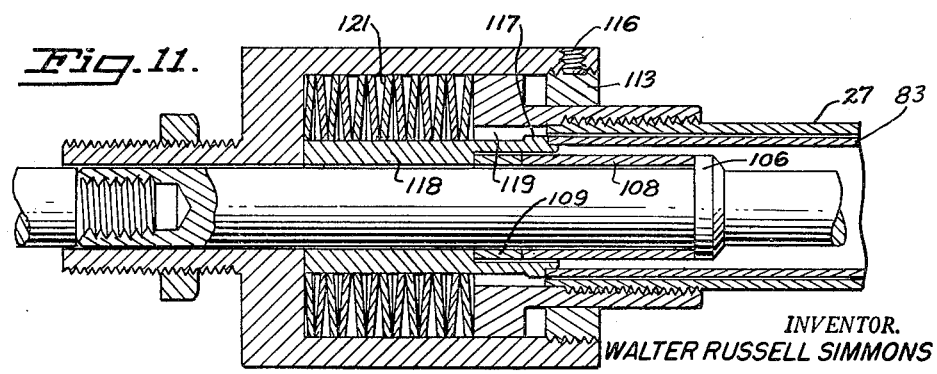

June 12, 1962 W. R. SIMMONS 3,038,626
MECHANISM FOR SETTING RIVETS
Filed July 19, 1960 4 Sheets-Sheet 4
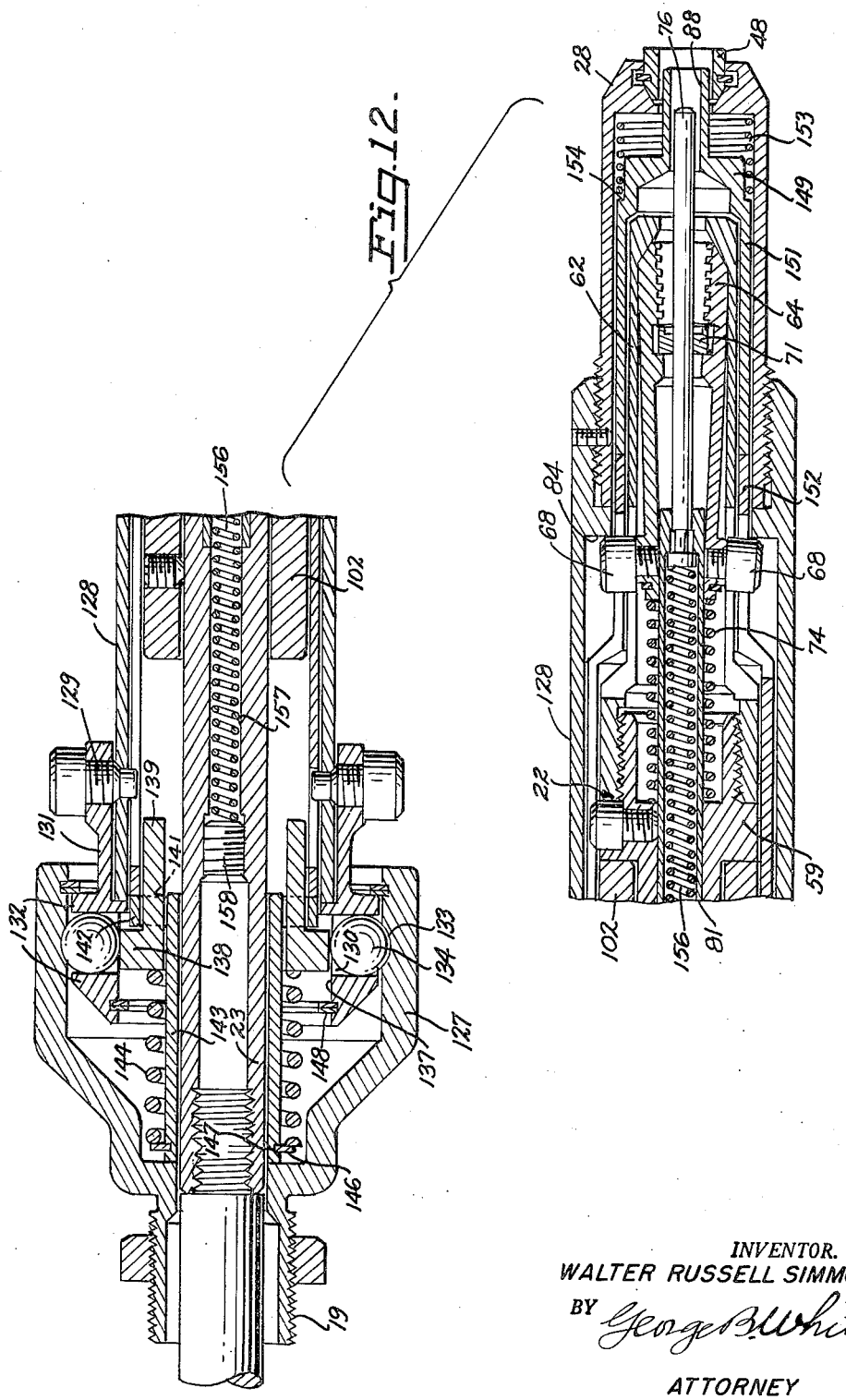
INVENTOR.
WALTER RUSSELL SIMMONS
BY George B. White
ATTORNEY

United States Patent Office 3,038,626
Patented June 12, 1962

3,038,626
MECHANISM FOR SETTING RIVETS
Walter R. Simmons, Buena Park, Calif., assignor to Townsend Company, a corporation of Pennsylvania
Filed July 19, 1960, Ser. No. 43,764
24 Claims. (Cl. 218—42)

This invention relates to a mechanism for setting rivets.

In setting rivets of the type where a locking ring is swaged into the head which surrounds a pin or stem as the latter is pulled through the head, it is necessary that the reaction force be first applied to the head and then after the rivet is set the reaction force be shifted to the locking ring so as to push the locking ring and swage it into the head around the stem, thereby to lock the stem in place. This principle may be used in connection with tubular rivets or also in connection with so called lock bolts, or other applications where such shifting of the reaction force is required.

In previous devices, such as shown in Huck Patent No. 2,053,719, this shifting of the reaction force was accomplished through a separate complicated mechanism requiring separate pistons for the application of opposite directional forces.

An object of the herein invention is to provide a mechanism for setting rivets with a locking ring swaged into the head around the pulling or setting stem, in which mechanism one anvil applies reaction force upon the head up to a predetermined stroke the stem and then the pulling mechanism acts to render said first anvil inoperative and shift the application of reaction force to another anvil mechanism which then applies said reaction force so as to push the locking ring into the head upon the further pulling of the stem.

Another object of the invention is to provide a mechanism for pulling the stem through a head for clinching up the work and setting the rivet and then swaging a locking ring into the head by means actuated by the same mechanism after a predetermined stroke of said stem.

Another object of the invention is to provide mechanism for setting a rivet of the type which has a stem extending through a tubular head which mechanism also swages a locking ring into said head and around the stem, and which mechanism can be easily attached to and operated by an ordinary type of reciprocating rivet setting tool, such as the one shown in Letters Patent No. 2,526,956 granted to H. W. Kugler on October 24, 1950; and said mechanism having within itself the device actuated by the pulling mechanism after a predetermined stroke to shift the reaction force from the head on said rivet to said locking ring.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a sectional view of one of the types of rivet which is set or installed by the rivet setting mechanism herein described.

FIG. 2 shows this type of rivet after it is set and about the position at which the reactionary force is to be shifted from the head of the rivet to the locking ring for swaging the locking ring into the groove of the stem in said head.

FIG. 3 shows this type of rivet installed with the lock ring set and the stem broken.

FIG. 4 is a longitudinal sectional view of the rivet setting mechanism at the beginning of its operation.

FIG. 5 is a longitudinal sectional view of the rivet setting mechanism when the reaction force is about to be shifted to the locking ring.

FIG. 6 is a longitudinal sectional view of the rivet setting mechanism after the lock ring has been swaged in position.

FIG. 7 is a cross-sectional view taken on the line 7—7 of FIG. 4.

FIG. 8 is a fragmental sectional view of a modified form of the outer sleeve control of said rivet setting mechanism.

FIG. 9 is a cross-sectional view taken on the lines 9—9 of FIG. 8.

FIG. 10 is a fragmental sectional view showing the point of engagement by the pulling mechanism for relieving the pressure of the outer anvil and applying pressure of the inner anvil in said modified form.

FIG. 11 is a fragmental cross-sectional view showing the modified rivet setting mechanism in relative position after the locking ring has been swaged into the head.

FIG. 12 is a broken sectional view of another embodiment of the invention.

The rivet setting device herein is for setting the type of rivet or fastener wherein pull is applied to a fastening element and reaction force is applied to a head through which the fastening element is pulled and after the setting of the fastening element a locking ring is pressed or swaged into the head by shifting the reaction force from said head to such locking ring. For instance, in the type of operation illustrated in FIGS. 1, 2 and 3, a stem 1 is pulled through a head 2 of a fastening element and while the pull is exerted on the stem 1 reaction force or pressure holds the head 2 in position. After the stem 1 has been pulled into and through the head 2 from the position shown in FIG. 1 to the position shown in FIG. 2, and the work has been clinched, then the reaction force or pressure of the devices is shifted to the locking ring 3, so as to push or swage the locking ring 3 into a recess or pocket 4 in the head 2 for locking the stem 1 in the head 2 as shown in FIG. 3.

This operation may be performed in connection with various types of fastener devices which involve the aforementioned steps of operation. In the herein illustration a so called blind rivet is shown in FIGS. 1, 2 and 3 for illustrative purposes. In such blind rivet a tubular rivet element 6 extends from the head 2. On the inner or tail end of the stem 1 is provided an enlarged blind head 7 which is connected to the stem 1 by a suitably tapered portion 8 to facilitate the entry of the enlarged blind head 7 into the tail 9 of the tubular rivet element 6 for expanding the said tail 9 for clinching the work, such as plates 11 and 12 together, tightly for eliminating the space 13 that may exist between the plates 11 and 12. After said clinching operation, in this illustrative rivet, during further pulling of the stem 1 the tapered portion 8 and the enlarged head 7 are wiredrawn into said tubular rivet element 6 so as to expand said tubular rivet element 6 against the sides of the surrounding holes 14 through the work or plates 11 or 12. When a grooved portion 16 of the stem 1 reaches into the head 2, then the locking operation is performed for swaging the locking ring 3 into the pocket 4 in the head 2 as shown in FIG. 3. The weakened portion at the groove 16 is exposed so that upon further pulling the stem 1, the stem would break off substantially at the outside face of the head 2.

While previously various guns existed for the purpose of performing similar operations, namely shifting the reaction pressure from the head to the locking ring after the setting of a rivet by pull exerted upon the stem, nevertheless such devices involve various specially designed and comparatively complicated mechanisms which were usable only in connection with this particular operation. Applicant solves the problem of using an ordinary usual gun for rivet setting which by the attachment of the riveting device hereinafter described can perform its operation without any material alteration or change of the usual riveting device.

The riveting device and attachment, as illustrated in FIGS. 4, 5 and 6 herein, has a holder casing 17 from the bottom 18 of which extends externally threaded nipple 19. This nipple 19 is adapted to be secured in the threaded portion of the forward end of the housing of the fluid-actuated reciprocated tool of the type shown in Patent No. 2,526,956 granted H. W. Kugler on October 14, 1950. This threaded nipple 19 would be threaded in place of the adapter sleeve denoted by the reference numeral 3 in said patent. Out of the casing 17 extends a primary or initial pressure device denoted in its entirety by the reference numeral 21. Inside of this primary pressure device 21 is a pulling device denoted in its entirety by the reference numeral 22 in the rearward end shaft portion 23 of which is provided a threaded socket 24 which is adapted to be secured over the threaded end of the piston rod denoted by the reference numeral 16 in the aforementioned Kugler patent. Thus by the normal operation of said gun or tool described in said Kugler patent, the pressure device 21 can be pressed against the rivet head 2, and the pulling device 22 can pull the rivet stem 1 when such reaction force or pressure is exerted. A secondary pressure device denoted in its entirety by the reference numeral 26 is provided between the first pressure device 21 and the pulling device 22 and is related by mechanism to be hereinafter described to automatically engage the locking ring 3 and shift the pressure to said locking ring 3 when the pressure of the initial pressure device 21 is relieved. The shifting is automatically performed by a mechanism to be hereinafter described after a predetermined stroke the pulling device 22.

In detail, the initial pressure device as shown in FIGS. 4 to 7 inclusive, includes a tubular nose sleeve 27, the nose 28 of which is suitably adapted to exert pressure upon the head 2 of the rivet to be set. This nose sleeve 27 has an enlarged rear portion 29 in which are formed both external and internal offset shoulders 31 spaced from the nose 28. The rearward end of the enlarged sleeve portion 29 has an externally threaded portion 32 which is threaded into a threaded socket 33 of a holder 34. The rear end of the holder 34 has an annular holder flange 36 fitting in the inner periphery of the holder casing 17. Suitable snap rings 37 in a groove 38 in the inside periphery of the holder casing 17 limit the forward movement of the holder 34. The holder flange 36 bears against a plurality of locking balls 39 which are nested in a shallow annular socket 41 in the inner periphery of the holder casing 17. The balls 39 are movable radially inwardly and outwardly in cylindrical pockets 42 formed radially and peripherally through the comparatively wide holder flange 36. This holder flange 36 is normally locked in position, where the balls 39 are aligned with and nesting in the socket 41, by a ball lock ring 43 the hub 44 of which extends into the interior of the flange 36 so as to engage the balls 39 and push the balls 39 outwardly into the socket 41. The ball lock ring 43 is pressed forwardly against the flange 36 into locking position by a suitable coil spring 46 which coil spring bears against the bottom 18 of the holder casing 17 and engages a shoulder 47 in the hub 44. Thus the outer pressure device 21 is held in fixed engagement with the holder casing 17 as long as the locking ring 43 is in locking position as shown in FIG. 4.

In the nose 28 of the nose sleeve 27 is provided a leveling button 48, the forward face 49 of which conforms to the shape of the rivet head 2. The rearward end 51 of the leveling button 48 is generally semi-spherical and is nested in a conforming semi-spherical socket 52 in the nose 28 so as to form substantially a ball and socket joint for angular adjustment of the leveling button 48 for firm engagement of the rivet head even if there is no accurate axial alignment of the pulling head at right angles to the axis of the rivet head 2. A snap ring 53 is suitably secured around the cylindrical periphery of the leveling button 48 near the base of its semi-spherical end 51 and is confined in an annular groove 54 inside of the nose 28 surrounding the corresponding portion of said leveling button 48 so as to allow the tilting of the leveling button 48 to the extent of the play between the snap ring 53 and the wider loose groove 54.

The pulling device 22 includes an enlarged shaft portion 55 extended forwardly from the rearward shaft portion 23 heretofore described so as to form a shoulder 56 to accommodate a coil spring 57 positioned around said rearward shaft portion 23 and bearing against said shoulder 56 at one end and against an inner shoulder 58 inside of the nipple 19 thereby to urge the pulling device 22 normally forwardly within the pressure device 21. A head 59 on the forward end of the enlarged shaft 55 has a threaded boss 61 on which is threadedly secured the rear end of a collet 62. This tubular collet 62 has in its forward end an opening 63 to permit the insertion of the rivet stem 1 therethrough in between gripping jaws 64. These gripping jaws 64 extend inside and rearwardly of the collet 62 and their rear ends are held together by a ring 66 positioned in grooves 67 in said rear ends of the jaws 64. Near the ring 66 are provided screws 68 threaded in the respective jaws 64, the heads of which screws extend radially outwardly from the jaws 64 and coact for opening the jaws in a manner hereinafter described. The inner peripheries of said jaws are suitably serrated for engagement with the correspondingly serrated pulling portion of the stem 1 so as to grip firmly said portion of the stem 1. It is to be understood that these jaws 64 may be formed also in a shape to engage other types of pulling portions of rivets such as the pulling heads on the type of rivets shown in the Cherry Patent No. 2,183,543.

Spaced from the free ends or points of the jaws 64 there are registering interior slots 69 on the inside faces of the jaws 64, in which slots 69 is held a limit ring 71. The jaws 64 are permitted to open and close relatively to said ring 71 yet retain the ring 71 at a fixed distance from the points of the jaws. The hole through the ring 71 is smaller than the diameter of the stem 1 hence the ring 7 predetermines the extent to which the pulling stem 1 is inserted between the pulling jaws 64.

The forward ends 72 of the jaws 64 are mitered at a taper corresponding to a tapered interior shoulder 73 in the end of the collet 62. A coil spring 74 between the boss 61 and the rear ends of the jaws 64 normally urges the gripping jaws 64 forwardly toward the nose of the collet 62. Thus when the pulling device 22 is pulled relatively to the pressure device 21, the tapered shoulder 73 of the collet 62 engages the mitered jaw points 72 and pulls the jaws 64 rearwardly. The opening 63 at the nose of the collet 62 is large enough to permit portions of the mitered tips of the jaw points 72 to project through said opening 63 and thereby be pressed together into gripping position as shown in FIG. 5. Further pulling of the collet 62 rearwardly pulls the jaws 64 and the stem 1 therewith for performing the setting operations heretofore described.

In the type of the rivet operation heretofore described the broken part of the stem 1 must be ejected from the device before the next riveting can be performed and for this purpose there is provided an ejector pin 76 in axial alignment with the hole of the limit ring 71, and registering with the end of the stem 1. A head 77 of the ejector pin 76 is engaged by an ejector spring 78 which latter bears against the bottom of a socket 79 in boss 61 of the shaft head 59. A bushing 81 surrounds the head 77 and part of the ejector pin 76 and contains the ejector spring 78. The rearward end of the bushing 81 is suitably secured such as by press fit in said socket 79. The jaw spring 74 bears against a shoulder on the rear end of said bushing 81 as shown. The forward end of the bushing 81 is tapered forwardly and is engageable by tapered shoulders 82 on the inner surfaces of the respective jaws 64 when the jaws are closed. In certain positions, such as indicated in FIG. 4, the tapered end of the bushing 81 is advanced forwardly relatively to the jaws to hold the jaws 64 open and to facilitate insertion of the stem 1.

The second reaction pressure exerting device 26 includes a locking ring sleeve 83 which slidably fits in the nose sleeve 27 and around the collet 62 and which has a shoulder 84 formed to correspond to the shoulder 31 on the nose sleeve 27. In the herein illustrative embodiment this locking ring sleeve 83 has in its forward end a recessed portion 86 in which is held the base 87 of a tubular anvil 88.

This tubular anvil 88 is slidable through a hole or passage 89 through the leveling button 48. The leveling button 48 constitutes the primary anvil for pressing on the rivet head during the initial pulling of the rivet stem. The tubular anvil 88 constitutes the secondary anvil to which the pressure or reaction force is shifted after a predetermined initial pull so as to press the locking ring 3 into the recess or pocket 4 of the rivet head 2 as heretofore described. The anvil base 87 is held in position in said recess 86 by suitable snap rings 91.

In the rearward enlarged portion 92 of the locking ring sleeve 83 is an interior shoulder 93. The heads of the screws 68 extending from the base of the jaws 64 extend through suitable slots 94 through the collet 62 and project so that in the forward extreme position of the collet 62 and of the locking ring sleeve 83 the heads of said screws 68 are pressed against the shoulder 93 for forcing the screws 68 to tilt and thereby move the jaws 64 apart, as shown in FIG. 4, against the action of coil spring 74. After the pulling device 22 begins to move from the position shown in FIG. 4 toward the position shown in FIG. 5 the heads of the screws 68 are withdrawn from the shoulder 93 and under the action of the coil spring 74 and of the tapered inner shoulder 73 of the collet 62, the jaws are forced to close into stem gripping position.

The length of the locking ring sleeve 83 is such that in the forward position of the collet 62 and of the locking ring sleeve 83 against the nose 28, as shown in FIG. 4, the rearward end of the locking ring sleeve 83 is spaced forwardly of an abutment flange 96 of a limit bushing 97 centrally positioned in the case 17, and abutting against bottom 18 of the case 17. This abutment flange 96 has a plurality of circumferentially spaced apertures 98, as shown in FIG. 7, so as to accommodate suitable fingers 99 which extend from a finger ring 101. At the forward end of the finger ring 101 and slidable inside of the locking ring sleeve 83 is a spacer bushing 102. The length of the spacer bushing 102 determines the stroke of pulling movement because the head 59 on the pulling shaft 55 abuts the spacer bushing 102 which in turn will push the finger ring 101 so as to push the fingers 99 through the apertures 98 against the hub 44 of the ball lock ring 43 and thus push the ball lock ring 43 and its hub against the action of the coil spring 46 out from under the locking balls 39 and permit the balls 39 to be released from the socket 41, as shown in FIGS. 5 and 6. Thus at the end of said predetermined stroke of the pulling device 22 the primary anvil or pressure sleeve 27 is unlocked from the holder case 17. A set screw 104 is threaded into the head 59 of the pulling shaft 55, the head 105 of which set screw 104 extends into a longitudinal slot 103 in the locking ring sleeve 83 and prevents rotation of the pulling shaft 55 relatively to the locking ring sleeve 83.

In operation, as the above device is attached to the kind of tool described in the Kugler patent heretofore described and as the initial pull is exerted, the rivet stem 1 is pulled while the first anvil or leveling button 48 presses against the rivet head 2. After the pulling device 22 is retracted so as to abut the spacer bushing 102, it pushes the finger ring 101 back to unlock the first anvil 48 as heretofore described and thereby renders the first anvil 48 axially floating in the holder casing 17, whereupon pressure is transmitted from the holder casing 17 to the limit bushing 97 and then through the abutment flange 96 to the rear end of the locking ring sleeve 83 and to the tubular anvil 88, as shown in FIGS. 5 and 6, thereby to shift the reaction force or pressure from the first anvil 48 to the second or tubular anvil 88.

In FIG. 6 the relative position of the tips of the two anvils 48 and 88 is illustrated somewhat exaggerated by showing the outer first anvil sleeve 27 pulled back so as to expose the tip of the second or tubular anvil 88. Inasmuch as the outer or first anvil sleeve 27 in this position floats freely, this relative position can be accomplished by manipulation although in normal operation the lock button may remain in light contact with the rivet head without exerting any pressure on the latter.

Upon further pulling of the stem 1 the first anvil sleeve 27 floats in the holder casing 17 in the position shown in FIG. 6 while the fixed abutment flange 96 transmits the pressure from the casing 17 to the inner or secondary anvil sleeve 83, thereby causing the pressure to be shifted to the tubular anvil 88 which latter pressure and reaction force will push and swage the locking ring 3 into the pocket 4, as heretofore described. As the pull of the stem continues, the stem 1 will break which completes the operation. When the tool is removed from the rivet and the pull is discontinued, then the coil spring 57 returns the pulling device 22 to its initial position and thus in turn pushes the outer sleeve 27 into its initial position. Then the spring 46 returns the ball lock ring 43 and its ball locking hub 44 to the initial position so as to lock the outer nose sleeve 27 in the position shown in FIG. 4. The return of the pulling device 22 to its initial position opens the jaws 64, as shown in FIG. 4, at which time the ejector pin 76 ejects the broken piece of the stem 1 through the tubular anvil 88 and the device is ready for the next riveting operation.

In the modified form shown in FIGS. 8 to 11 inclusive, a collar 106 on the pulling shaft of the pulling device pushes a spacer bushing 108, in the same manner as the previously described form of the device, against the hub 109 of a flange head 111 of a sleeve holder 112 threaded on the rearward end of the outer or first anvil sleeve 27. Forward movement of this flange head 111 is limited by a plug ring 113 threaded into the open end of this modified holder casing 114. The plug ring 113 is held by a set screw 116. Prior to the pulling shaft collar 106 reaching its limit position, as shown in FIG. 11, the inner anvil sleeve 83 abuts against circumferentially spaced fingers 117 extended from a central limit bushing 118 through apertures 119 through the flange head 111, as shown in FIG. 9, so as to shift the pressure or reaction force to the tubular anvil heretofore described. At this time the anvil sleeve 83 is rigidly backed by the casing 114 so as to apply direct pressure while the outer sleeve of the primary anvil yields by overcoming the tension of belleville spring washers 121 in the casing 114. The belleville spring washers 121 are preloaded for a predetermined pressure, for properly accomplishing the shifting of the pressure from the first anvil to the second anvil. In other respects the device operates as heretofore described.

In the second modified form shown in FIG. 12 the holder casing 127 is shaped somewhat differently than the previously described holder casing 17, but its nipple 19 is connected to the setting gun in the manner heretofore described in connection with the first embodiment.

The enlarged portion or the outer nose sleeve 128 is connected by suitable set screws 129 to a holder 131. A holder flange 132 on the rear end of the holder 131 is slidable within the holder casing 127 and has radial pockets 130 to accommodate the locking balls 134. These locking balls 134 are locked in the shallow groove 133 similarly to the locking described in connection with the first embodiment herein.

In this modified form the holder flange 132 has a generally cylindrical socket 137 open from its rear end so as to accommodate a locking ring 138. Abutment fingers 139 extend forwardly from the locking ring 138 through circumferentially spaced holes 141 in an abutment flange 142 of a bushing 143. The bushing 143 bears against the bottom of the holder casing 127.

A coil spring 144 bears at one end thereof against the locking ring 138 and at its other end against a snap ring 146 in a groove 147 near the rear end of the bushing 143. The spring 144 normally presses the locking ring 138 forwardly, in which position the locking ring 138 locks the balls 134 in the groove 133 so that pressure is transmitted through the casing 127 to the enlarged portion of the nose sleeve 128 and to the pressure head on the latter. The rearward stroke of the locking ring 138 is limited by a suitable snap ring 148 in the cylindrical socket 137 and spaced rearwardly from the locking position of the locking ring 138.

Another difference between this modified form and the first described embodiment of the invention is that the spacer bushing 102 in this form is suitably secured by a set screw on the pulling shaft adjacent the head 59 thereof so as to reciprocate with the pulling shaft. Consequently in this embodiment as the shaft is pulled so as to pull the rivet stem in the manner heretofore described, near the end of the pulling stroke the spacer bushing 102 abuts against the locking fingers 139 and pushes the locking ring 138 against the spring 144 so as to release the balls 136 and render the outer sleeve 128 and the first anvil thereon floating. However, in this form, as the locking ring 138 is pushed further, as the pulling of the stem continues, it will engage the snap ring 148 and positively move the holder flange 132 and the holder 131 as well as the primary anvil rearwardly relatively to the holder casing 127 into an out of the way position to permit freer action to the secondary or tubular anvil 88, heretofore described.

Further difference of this modified embodiment from the first described embodiment is that the tubular anvil 88 extends from a base 149 which is on the end of a forward section 151 of the locking ring sleeve 152 and is held in contact therewith by a coil spring 153 between the inner face of the nose 28 and a shoulder 154 at said base 149 so as to urge said nose 28 and said forward section 151 into the initial position shown in FIG. 12.

Another difference of this modified form from the first described form is that the ejector spring 156 in this form extends into a central hole 157 of the pulling shaft and bears against a threaded plug 158 by which latter the tension of the ejector spring 156 can be suitably predetermined.

The rear end of the inner sleeve 152 abuts the abutment flange 142 of the abutment bushing 143. The spring 153 holds the inner sleeve 152 in such abutting position at all times, but when the balls 134 are released, then the floating outer sleeve 128 and first anvil 28 are pushed back into the holder case 127 so that the inner anvil 88 projects into operating position to push the locking ring into the rivet.

A further difference in this modified embodiment from the first described embodiment is that the screw heads 68 project through slots in the locking ring sleeve 152 and rest on shoulder 84 of nose sleeve 128. Near the forward end of the movement of the pulling device 22, the screw heads 68 encounter the shoulder 84 forcing the jaws 64 to open as the pulling device 22 pushes the collet 62 farther to the forward position, thus permitting the mitered jaws to slide relatively backward and outward from the corresponding mitered surface of the collet 62.

It can be seen that in this modified embodiment the mitered ends of the jaws 64 do not project out of the front end of the collet 62 and therefore the only means of opening the jaws is through contact of the screw heads 68 with the shoulder 84. Furthermore, the jaws 64 can be moved backward any predetermined desired distance until screws 68 encounter end of the slots through which they project in the collet 62. Thus varying lengths of rivet stem 1 can be inserted into the pulling head against the limit ring 71 and force the jaws to rear position sufficiently to permit the leveling button 48 to contact the rivet head 2 prior to the beginning of the pulling operation. The significance of this feature is that rivets of varying gripping capacity having different lengths of stem 1 projecting above the rivet head but having the same length of stem 1 from the end to the breaking notch 16 can be installed with the same stroke setting of the pulling device.

In other respects the modified form shown in FIG. 12 operates for setting a rivet in the manner described in connection with the first described embodiment of this invention.

I claim:

1. In a device for setting a rivet of the type wherein a first element is pulled while reaction force is applied to a second element to clinch the work and wherein means are coacting with said elements under reaction force to interlock said elements; means for pulling said first element, a pair of anvils one within the other being movable relatively to one another to apply reaction force sequentially in the direction of said second element, means for directing said reaction force to said anvils, releasable means to connect said reaction force directing means to one of said anvils to hold said second element while said first element is pulled, and means activated by said pulling means to release said releasable means and the said reaction force from said one anvil and shift said reaction force to the other anvil after a predetermined stroke of pull of said first element, said other anvil being capable of applying said reaction force to said coacting means for interlocking said element.

2. The rivet setting device defined in claim 1, and said reaction force directing means including a holder casing, an outer sleeve supporting said one anvil, and an inner sleeve reciprocable in said outer sleeve supporting said other anvil, said other anvil being extensible through said first anvil.

3. In a device for setting rivets wherein a securing pin is pulled through a head while reaction force is applied to said head and wherein a locking ring is pressed into said head and around said pin after the rivet is set for locking said pin and head together; a holder casing, outer sleeve extended from said casing, an anvil on said outer sleeve fitting over said head to exert reaction force thereon, an inner sleeve reciprocable in said outer sleeve, a second anvil extended from said inner sleeve through said first sleeve and through said first anvil and being capable of applying reaction force to said locking ring to press it into said head and around said pin for locking the same together, gripping and pulling means inside said second sleeve for engaging and pulling said pin while reaction force is applied through either of said anvils, and means actuated by said gripping and pulling means for shifting the same reaction force from said first sleeve to said second sleeve after a predetermined stroke of pull of said pin.

4. A device for setting rivets of the type wherein a pin is pulled through a generally tubular head, a mechanism for gripping and pulling the pin, a pair of anvils for applying reaction force to the tubular head, one of said anvils being capable of exerting force for locking the tubular head onto the pin, and means for effecting operation of said anvils in sequential order during the pulling of the pin with said one anvil being operated after the other anvil and after a predetermined stroke of said gripping and pulling mechanism, said means including an element common to both anvils for applying said reaction force, releasable means to operatively connect said other anvil to said element for applying said reaction force, and means actuated by said predetermined stroke to release said releasable connecting means so as to shift said reaction force to said one anvil.

5. A device for setting rivets of the type comprising a pin extended through a tubular head and a locking ring to be swaged into said tubular head adjacent said pin, a mechanism for gripping and pulling the pin, a pair of anvils for applying reaction force in sequential order to said head and to said locking ring, one of said anvils being capable to swage said locking ring into said head around said pin, means to hold the other anvil in operative position to engage said head and apply the reaction force on said head, means to render said other anvil inoperative after a predetermined stroke of pulling and to apply the reaction force to said one anvil and to said locking ring for swaging it into said head.

6. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after said predetermined stroke and after the release of said first holder element to transmit reaction force from said holder case to said second anvil.

7. The device for setting rivets as defined in claim 6, and a member on said holder case for attaching the holder case to the pressure element of a power tool, and a connecting element on said gripping and pulling means for connecting the same to the pulling mechanism of the power tool.

8. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, to swivelably connect said first anvil to the first holder element so as to compensate for axial misalignment of said first holder element with said rivet head.

9. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, said first holder element being generally tubular, a socket in the anvil end of said first holder element, a face on said first anvil fitting the said rivet head, and a base on said first anvil swivelably fitting into said socket, and means to loosely retain said first anvil base in said socket.

10. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, said first holder element being generally tubular, and said releasable connecting means for said first holder element including a flange at the end of said first holder element within said holder case, means to limit forward movement of said flange outwardly of said holder case, circumferentially spaced radial pockets in said flange, a locking ball in each pocket, said holder case having an annular socket in its inner periphery for engagement by said balls, a locking element adjustable inside of said flange for locking said balls in said pockets and in said socket, and resilient means normally urging said locking element into ball locking position.

11. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, said first holder element being generally tubular, and said releasable connecting means for said first holder element including a flange at the end of said first holder element within said holder case, means to limit forward movement of said flange outwardly of said holder case, circumferentially spaced radial pockets in said flange, a locking ball in each pocket, said holder case having an annular socket in its inner periphery for engagement by said balls, a locking element adjustable inside of said flange for locking said balls in said pockets and in said socket, and resilient means normally urging said locking element into ball locking position, and adjustable abutment means on said gripping and pulling element interengageable after a predetermined stroke of said pulling element with said locking element for moving said locking element out of engagement from said balls thereby to release the reaction force on said first anvil holder element.

12. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, said first holder element being generally tubular, and said releasable connecting means for said first holder element including a flange at the end of said first holder element within said holder case, means to limit forward movement of said flange outwardly of said holder case, circumferentially spaced radial pockets in said flange, a locking ball in each pocket, said holder case having an annular socket in its inner periphery for engagement by said balls, a locking element adjustable inside of said flange for locking said balls in said pockets and in said socket, and resilient means normally urging said locking element into ball locking position, and an abutment member bearing against said holder casing and extending in the path of said second anvil holder element to be engaged by the latter to transmit reaction force from said holder case to said second anvil holder element and to said second anvil after the first anvil holder element is released from said holder case and from said reaction force.

13. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, said first holder element being generally tubular, and said releasable connecting means for said first holder element including a flange at the end of said first holder element within said holder case, means to limit forward movement of said flange outwardly of said holder case, circumferentially spaced radial pockets in said flange, a locking ball in each pocket, said holder case having an annular socket in its inner periphery for engagement by said balls, a locking element adjustable inside of said flange for locking said balls in said pockets and in said socket, and resilient means normally urging said locking element into ball locking position, and an abutment member bearing against said holder casing and extending in the path of said second anvil holder element to be engaged by the latter to transmit reaction force from said holder case to said second anvil holder element and to said second anvil after the first anvil holder element is released from said holder case and from said reaction force, said resilient means for urging said locking element into ball locking position bearing against said abutment member so as to hold said abutment member against the bottom of said holder case.

14. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, and coacting means between said gripping and pulling mechanism and said first anvil holder element to release said gripping means from said pin in the initial forward position of said gripping and pulling mechanism.

15. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, the gripping and pulling mechanism including a collet, a plurality of sectional jaws positioned in said collet, yieldable means to normally urge the gripping ends of the jaws apart, a limiting element between the gripping faces of said jaws having an aperture therethrough smaller than the adjacent diameter of the pin to be pulled to predetermine the limit of insertion of the pin into said gripping jaws, each of said jaws having a mitered tip, and said collet having a mitered inner periphery coacting with said mitered tips to urge said jaws together when said collet is pulled rearwardly relatively to said jaws for gripping the pin inserted therein, said resilient means urging said jaws toward said mitered end of said collet.

16. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, the gripping and pulling mechanism including a collet, a plurality of sectional jaws positioned in said collet, yieldable means to normally urge the gripping ends of the jaws apart, a limiting element between the gripping faces of said jaws having an aperture therethrough smaller than the adjacent diameter of the pin to be pulled to predetermine the limit of insertion of the pin into said gripping jaws, each of said jaws having a mitered tip, and said collet having a mitered inner periphery coacting with said mitered tips to urge said jaws together when said collet is pulled rearwardly relatively to said jaws for gripping the pin inserted therein, said resilient means urging said jaws toward said mitered end of said collet, and an ejector pin reciprocable through said limiting element and through said gripping mechanism, a spring inside of the pulling device normally urging said ejector pin forwardly through said gripping jaws and through the mitered end of said collet and through said secondary anvil for ejecting a broken pin therefrom.

17. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, and said first anvil having an opening therethrough, and said second anvil being generally cylindrical and slidable through said opening in the first anvil for engagement with the locking ring to push the locking ring into the tubular head of the rivet.

18. In a device for setting rivets of the type wherein a pin is pulled through a generally tubular head, a mechanism for gripping and pulling the pin, a first anvil for applying reaction force to the tubular head, interlocking means for said head and pin, a second anvil capable of pressing said interlocking means for locking said tubular head unto the pin, a holder case, a first holder element for the first anvil extended from said holder case; releasable means to connect said first holder element to said holder case, said first holder element being movable in said holder case when said releasable means are released, a second holder element movable relatively to the first holder element and supporting said second anvil, means operated by said gripping and pulling mechanism after a predetermined stroke for releasing said releasable locking means, said second holder element coacting with said holder case after the release of said first holder element to transmit reaction force from said holder case to said second anvil, said releasable means to connect said first holder element to said case including belleville springs in the holder case normally holding the said first holder element into operating position and being compressible to shift the reaction force to the second holder element.

19. In an attachment for a rivet setting tool having a reaction pressure member and relatively movable pulling member for the type of rivets wherein pin is pulled through a tubular head and a locking ring is pressed into the head and around the pin to interlock the same, a holder case attachable to the said pressure element of said tool, a pulling shaft extended through the holder case and attachable to the pulling element of said tool, an outer anvil sleeve, a first anvil on the end of said sleeve capable of engaging said rivet head to transmit reaction force to it, a flange on the holder sleeve inside of said holder case, a second anvil sleeve reciprocable inside of the first anvil sleeve, a second anvil on the forward end of said second sleeve extensible through said outer sleeve and through said first anvil and engageable with said locking ring to exert reaction forces on the locking ring for pushing and swaging said locking ring into said head and around said pin, an abutment in said casing engageable by the second sleeve for transmitting reaction force through said second sleeve and to said second anvil, gripping and pulling means on said shaft reciprocable inside of said second sleeve for engaging and pulling said pin, yieldable means to releasably hold said outer holder sleeve in engagement with said holder case to transmit reaction force to the first anvil, and means actuated by said pulling element after a predetermined stroke to release said yieldable releasable means so as to relieve the reaction force on said first anvil and thereby to shift said reaction force to said second anvil.

20. In a rivet setting tool, for rivets of the type wherein a pin is pulled through a rivet head and means are provided to interlock said rivet head and pin; a holder case for exerting reaction force toward said head, an outer anvil sleeve, an outer anvil on an end of the outer sleeve to apply said reaction force to said rivet head, the other end of the outer sleeve being movable in the case, releasable locking means to lock said other end of the outer anvil sleeve to the holder case, a resiliently urged locking member normally to hold said releasable locking means in locking position; an inner anvil sleeve reciprocable inside the outer anvil sleeve, an inner anvil in an end of the inner sleeve being movable through said outer anvil to apply said reaction force to said interlocking means, an abutment member in said holder case, the other end of said inner anvil sleeve abutting said abutment member so as to transmit said reaction force from said holder case to said inner anvil; a pin engaging device reciprocable in said inner sleeve to receive and engage an end of said pin, a pulling element in said inner sleeve and extended through said holder case and connected to said pin engaging device for pulling said device and said pin oppositely to said reaction force, a releasing element on said pulling device for engaging and releasing said resiliently urged locking member after a predetermined stroke of pull of said pulling device thereby releasing said locking means and relieving said outer sleeve from said reaction force and causing said reaction force to be applied through said inner sleeve and inner anvil to said interlocking means, said inner anvil having a passage for inserting of said pin therethrough.

21. In a rivet setting tool, the device defined in claim 20, and an element at the end of said outer sleeve in said holder case engageable by said resiliently urged locking member for moving said outer sleeve into said holder case so as to move said outer anvil rearwardly of the inner anvil.

22. In a rivet setting tool, the device defined in claim 21, and resiliently yieldable means to urge said outer sleeve into its locked position relatively to said holder case.

23. In a rivet setting tool, the device defined in claim 21, and an element in said flange head engageable by said locking bushing when pushed by said abutment element for pushing said outer anvil sleeve oppositely to said reaction force so as to expose said inner anvil beyond said outer anvil.

24. In a rivet setting tool, for rivets of the type wherein a pin is pulled through a rivet head for clinching the work, and an interlocking element is pressed into the head to lock said pin to said head; a holder case for exerting reaction force toward said rivet head, an outer anvil sleeve, an outer anvil on an end of said outer anvil sleeve to apply said reaction force to said rivet head, a flange head on the other end of said outer anvil sleeve in said holder case, radially movable locking balls in said flange head, said outer case having an indent in its periphery to hold said balls in locking position, a locking bushing movable in said flange head and engaging said balls so as to push said balls radially outwardly into said locking position, a spring in said case normally urging said locking bushing into said ball locking position; an inner anvil sleeve reciprocable in said outer anvil sleeve, an inner anvil on the end of said inner anvil sleeve adjacent to said outer anvil and adapted to project through said outer anvil, an abutment in said holder case in registry with the end of said inner anvil sleeve at said casing to transmit said reaction force to said inner anvil sleeve; pin pulling means reciprocable in said inner anvil sleeve and extending through said holder case for pulling said pin; an abutment element on said pulling means for engaging said locking bushing after a predetermined stroke of pull of said pulling means so as to shift said locking bushing away from said balls and relieve said outer anvil sleeve from said reaction force thereby to shift said reaction force to said inner anvil, said inner anvil being tubular and said pin being extended therethrough to said pulling device.

References Cited in the file of this patent
UNITED STATES PATENTS

| | | |
|---|---|---|
| 2,053,719 | Huck | Sept. 8, 1936 |
| 2,396,001 | Fischer | Mar. 5, 1946 |
| 2,397,111 | Huck | Mar. 26, 1946 |
| 2,526,956 | Kugler | Oct. 24, 1950 |
| 2,582,248 | Gookin | Jan. 15, 1952 |
| 2,820,566 | Hecke | Jan. 21, 1958 |